United States Patent [19]

Craig et al.

[11] Patent Number: 4,792,423

[45] Date of Patent: Dec. 20, 1988

[54] METHOD FOR MAKING SOLID ROCKET PROPELLANT

[75] Inventors: Preston S. Craig; Gordon S. Oakley, both of Huntsville, Ala.

[73] Assignee: United Technologies Corporation, Hartford, Conn.

[21] Appl. No.: 73,260

[22] Filed: Jul. 13, 1987

[51] Int. Cl.$^4$ ................................................ C06B 21/00
[52] U.S. Cl. ...................................... 264/3.1; 264/3.2; 264/3.3; 102/289; 102/291
[58] Field of Search ..................................... 264/3.1–33; 102/289, 290, 291

[56] References Cited

U.S. PATENT DOCUMENTS

| | | | |
|---|---|---|---|
| 3,731,584 | 5/1973 | Gilbert | 264/3.1 X |
| 3,943,208 | 3/1976 | Ratte et al. | 264/3.1 X |
| 4,098,625 | 7/1978 | French et al. | 149/19.3 |
| 4,241,661 | 12/1980 | Elrick et al. | 102/103 |
| 4,420,440 | 12/1983 | Marz | 264/3.2 |
| 4,615,270 | 10/1986 | Bell | 264/3.2 X |
| 4,622,000 | 11/1986 | Müller et al. | 264/3.2 X |
| 4,660,475 | 4/1987 | Rogowski et al. | 264/3.1 |

Primary Examiner—Peter A. Nelson

[57] ABSTRACT

A method of making solid rocket propellant that facilitates tailoring of a variable burn rate. The method comprises molding binder and fuel and/or oxidizer to produce, for example, a molded strip of solid rocket propellant material. The molded solid rocket propellant material is formed into a desired shape by, for example, filament winding. In a preferred aspect, the solid rocket propellant is cured prior to being encased in a rocket motor casing. This improves rocket propellant to rocket engine casing bonding. Yet another aspect of this invention is a method of making solid rocket propellant comprising forming binder and oxidizer into separate strips and combining the binder and oxidizer strips to form solid rocket propellant material.

1 Claim, No Drawings

METHOD FOR MAKING SOLID ROCKET PROPELLANT

TECHNICAL FIELD

The field of art to which this invention pertains is methods of making solid rocket propellant.

BACKGROUND ART

Generally, conventional solid rocket motors are comprised of a propellant system, a casing, and a nozzle. Solid rocket motors have been made by curing rocket propellant in bulk and then loading it into a rocket casing. More typically, solid rocket motors are made by mixing the propellant components including binder (which is a fuel), oxidizer, fuel (e.g. aluminum) and other additives, and loading (casting) the mixture into a rocket motor casing wherein the "green" propellant mixture is then cured in-situ. Normally the entire loading and curing process is conducted under high vacuum to eliminate air entrapment which would cause propellant faults called "voids".

Specifically, the propellant composition is typically mixed in high shear mixers or extruders such as those used in the bread-making industry. The semi-fluid mixed materials are cast into a motor casing, generally under vacuum conditions until the casing is full. The casing typically will have been prepared prior to casting, by the application of a system of liners (bonding agents) and an overcoat of an insulation material of suitable thickness. Heat is normally used to initiate and control the propellant cure phenomenon resulting in the material becoming a semi-elastic solid.

During cure, the mixture will shrink, which can cause a tensile/shear stress across the bond area, thus creating a problem that often leads to bond failure. Also, this same stress condition tends to magnify as the assembly cool after curing. This condition is magnified at the inner surface of the propellant, frequently enough to cause propellant cracking to occur. The quality of the finished propellant/casing assembly is dependent upon the exclusion of entrapped air; upon the integrity of the propellant to insulation/liner bond; and upon the absence of cracks in the propellant surface. Under operating (burning) conditions, no significant excess propellant burning surface area is permitted such as that which would result in a debond area or around an air-inclusion or that which would be exposed as a propellant surface crack. Following propellant cure, a nozzle is normally attached to finish the assembly.

Although this has been the rocket industry standard for many years, a variety of problems can result (e.g., shrinkage of the propellant mixture during cure, resulting in bond failure to the rocket insulation and casing). Bond failure and/or excessive voids can and often does cause solid rocket motor malfunction that results in explosion or casing burn through, both of which results in loss of motor, vehicle, and mission.

Accordingly, there has been a constant search in this field of art for different methods of making propellants and solid rocket motors that are not subject to such flaws.

DISCLOSURE OF INVENTION

This invention is directed to a method of making solid rocket propellant that facilitates tailoring of a variable burn rate. The method comprises molding binder and fuel and/or oxidizer to produce, for example, a molded strip of solid rocket propellant material. The molded solid rocket propellant material is formed into a desired shape by, for example, filament winding. In a preferred aspect, the solid rocket propellant is cured prior to being encased in a rocket motor casing. This improves rocket propellant to rocket engine casing bonding.

Yet another aspect of this invention is a method of making solid rocket propellant comprising forming binder and oxidizer into separate strips and combining the binder and oxidizer strips to form solid rocket propellant material.

This invention makes a significant advance in the field of solid rocket propellants by providing methods for tailoring of a variable burn rate, improving propellant to rocket engine casing bonding and facilitating quality control of propellant prior to its joining with the rocket engine casing.

The foregoing and other objects, features and advantages will be apparent from the specification and claims of the present invention.

BEST MODE FOR CARRYING OUT THE INVENTION

Typically, any solid rocket propellant composition, and any liner/insulation material(s) may be used with this invention. Propellant systems are typically comprised of a binder (which is itself a fuel), fuel, an oxidizer, and certain additives. Although the binder is a fuel it will be referred to as a binder to distinguish it from the fuels (e.g., aluminum described below. Typical binders are a liquid polymeric material such as polysulfide, polyurethane, polybutadiene, butyl, nylon, polyethylene, etc. It is preferred to use a thermoplastic binder because it can be more easily formed after partial curing. In contrast, a thermosetting binder sets up quicker to a less flexible state when partially cured as described below. Preferred thermoplastic binders include polybutadiene and polyvinylchloride (PVC). These can be cured by applying heat or by initiating a cure reaction by exposure to X-rays, UV rays, or other photon sources. Typically, fuels such as powdered aluminum, boron or beryllium stabilize (e.g. normalize) the burning rate. Typical oxidizers are ammonium-perchlorate, or ammonium nitrate in a solid, granular form of various particle sizes. A variety of additives may be incorporated, for example, as burning rate adjusters or to make the mixed composition more fluid in order to ease processing problems. Ferric oxide is a typical burning rate adjuster. Fluidizers are normally selected from any of the conventional plasticizers.

Typically, a mixture comprising rocket propellant binder, oxidizer, fuel, and other additives is made, molded into a strip and formed into a shape. However, as will be clear from the following description, the oxidizer, fuel and other additives can either be added initially or later (e.g. after molding) or in a variety of combinations and sequences during different process steps to facilitate manufacture and/or to achieve the properties required for the desired application.

The mixture is molded in a suitable molding apparatus (e.g. pressure orifice device) such as an extruder, a calendaring mill, or any conventional commerical sheet or strip production process. These apparatuses preferably preclude the entrapment of air voids in the propellant. During molding, initial addition of oxidizer, fuel, additives or combinations thereof or additional quantities of oxidizer, binder, fuel, additives or combinations thereof may be added in predetermined, controlled, and varying amounts to the binder as it is molded. Alternatively fuel, oxidizer, additional binder, or additives or combinations thereof may be added subsequent to molding (but prior to winding). The above additions facilitate attaining the desired burning rate (e.g. thrust-trajectory ratio). In addition, they facilitate achieving a variable burning rate that may be tailored to the particular application by selecting strips or laminates made from various propellant formulations.

The molded solid rocket propellant is typically precured (e.g. partially cured) during or subsequent to molding (e.g., extrusion at conventional times and temperatures as required. This results in a strip of partially cured solid rocket propellant. By partially cured is meant having a viscosity less than about one (1) kilpoise. This precuring facilitates handling and forming. The molded product's shape depends upon the desired application and the molding apparatus used. The molded propellant typically is in the form of a strip. By the term strip is meant any sheet, ribbon, film, or fiber having exemplary dimensions of from about 0.025 cm (0.010 inch) to about 5.1 cm (2 inches) in thickness and a width of about 0.025 cm (0.010 inch) to about 305 cm (120 inches) and lengths as desired.

The partially cured propellant is then formed into the desired shape for the particular application required. This may be done by a variety of techniques depending upon the shape needed and the form (e.g., ribbon, fiber) of the precured molded propellant. For example, ribbon shapes can be achieved by filament winding of propellant that has a fiber shape. Alternatively, a solid cylinder shape can be achieved using propellant shaped like a ribbon and a filament winding machine. Ribbons can be wound on a mandrel at a slant (i.e., not facing parallel to the mandrel surface) so that part of the ribbon extends from the mandrel radially, obliquely, or vertically, instead of winding the ribbon flat on the mandrel. This facilitates the use of wider ribbons and promotes more efficient combustion.

Depending on the shape of the strips, a variety of forming techniques can be used to achieve close packing when mixing (e.g., extruding) precured fuel and precured oxidizer. For example, fuel/binder surrounding close packed oxidizer fibers can be extruded. The oxidizer fibers may have varying shapes (e.g., square) to facilitate close packing.

Typically, precured propellant is postcured during forming at conventional times, temperatures, and pressures to achieve the final propellant product. However, the precured propellant can be postcured during steps subsequent to the forming such as after encasement in a rocket casing. It is preferred to postcure using radiation (e.g., I.R., U.V. or X-Ray) preferably with a zone radiator as this provides sufficient curing without the need for a high temperature, high pressure cure which can require larger facilities. Typically, the postcure is also used to cure an adhesive (that the propellant strips are wetted with) used for bonding to insulation.

Alternatively, the fuel and oxidizer may be formed or molded into separate partially cured fuel strips and oxidizer strips. Then the strips can be combined into the desired shape to achieve the desired fuel/oxidizer ratios by tailoring the amount and position of each strip. For example, in a lamination process, X thickness of fuel ribbon and Y thickness of oxidizer ribbon may be combined to achieve the desired fuel oxidizer ratio and hence burning rate.

In addition, aluminum fibers (instead of powder) may be filament "wound-in" as a separate fiber or as a very thin strip that is preformed. This provides, for example, greater tensile strength. Burn rate additives such as ferric oxide may be added in a similar manner.

Through accurate control of the fuel/oxidizer/ binder/additive ratio as a whole and control of the ratio (e.g., varying it) across the solid rocket propellant the burn rate as a function of time can be tightly controlled. This tailoring facilitates the provision for optimum thrust vs. time performance which enhances the launch vehicle or missile system operating efficiency.

The formed cured rocket propellant is then encased (e.g., overwrapped) using filament winding equipment. Insulation can be overwrapped using filament winding equipment in the same fashion as for the propellant. Strips, ribbons, sheets, fibers, or films can be made from insulating compositions, such as binders (rubber) with noncombustible fillers such as clay, lava, vermiculite, or asbestos. This ovewrap would normally use the ribbon, sheet, films, or strips in the flat attitude (i.e., surfaces parallel to the mandrel surface). The adhesive may be cured in the process of may be later cured after the rocket motor casing is overwrapped.

The casing can be overwrapped using conventional filament winding techniques and materials such as glass-filaments and epoxy binders, or using more advanced materials such as graphite fiber, and epoxy, to form a high performance, high pressure (i.e., 200 PSIG to 2000 PSIG) chamber.

This process accounts for propellant cure shrinkage long before the insulation, liner and casing are applied. Thus, it reduces bond failue for propellant surface cracking due to the in-situ cure shrinkage encountered in conventional cast-in-place practice. A second advantage is that little opportunity exists for the entrapment of enough air to form significant propellant voids since filament (ribbon, strip) winding techniques can virtually exclude air entrapment.

Moreover, the propellant and liner/insulation may be made as described, and then inserted into a premanufactured casing of any kind (i.e., roll and welded steel, forged ring, or filament wound) as a propellant/insulation cartridge. The cartridge can be bonded in place within a premanufactured casing with adhesives used for cartridge loaded solid rocket motor processing.

Moreover, the process can be reversed, that is the casing can be first provided, and the technique for wrapping insulation, liner, and propellant can be accomplished by an internal layup method (i.e., like wallpaper application using a continuous paper roll).

This process takes advantage of emerging technologies that have developed for forming films, sheets, filaments and binders providing for an automated process. In addition, it expands the choice of binders that may be used since tailoring is so simple. It also allows for tailoring of a variable burn rate and allows for superior quality control of the propellant product before it is joined with the rocket engine casing thereby saving significant labor and materials on wasted engine casings. Thus, it greatly reduces voids in the propellant grain. It insures rocket propellant to rocket engine casing bonding and reduces tensile forces across that bond line resulting in an extension of temperature limits. Finally, it enhances propellant integrity since the stress induced propensity for surface cracking will be significantly eliminated.

Although the invention has been shown and described with respect to detailed embodiments, it should be understood by those skilled in the art that various changes and omissions in form and detail may be made therein without departing from the spirit and scope of the invention.

We claim:

1. A method of making a solid rocket motor comprising:

(a) molding separate strips of binder, fuel and oxidizer;
(b) forming said strips into propellant having a predetermined shape and having a predetermined burn rate that varies across the propellant shape;
(c) curing said shaped propellant; and
(d) encasing said shaped propellant in a rocket casing.

* * * * *

UNITED STATES PATENT AND TRADEMARK OFFICE
CERTIFICATE OF CORRECTION

PATENT NO. : 4,792,423
DATED : December 20, 1988
INVENTOR(S) : Preston S. Craig, Gordon S. Oakley It is certified that error appears in the above-identified patent and that said Letters Patent is hereby corrected as shown below:

Column 1, after the title, please insert the following:

--Description

This invention was made with Government support under a contract awarded by the Air Force. The Government has certain rights in this invention.--

Signed and Sealed this

Twenty-eighth Day of November 1989

Attest:

JEFFREY M. SAMUELS

Attesting Officer     Acting Commissioner of Patents and Trademarks